position. As the cage rotates, the stock is resiliently held in place by the chain 144, and the grinding wheels 133 and 134 which rotate rapidly, clean the stock at those places where the contacts will be made in the heater.

When the stock has travelled a half revolution with the cage 110, it reaches a chute 88$^a$ and is discharged into it. It will be noted that the cage 110 is driven in timed relation to the shaft 4, and hence a piece of stock is delivered into the chute 88$^a$ for each one taken therefrom by the automatic clamps previously described. The gears 111, 112, 114 and 117 are designed to give this result. In this manner, the chute 88$^a$ will always contain some stock, and will never overflow. In starting the machine, the chute 88 or 88$^a$ may desirably be given a surplus of a few pieces.

I claim:

1. In a rotary metal stock heater, a tank mounted to rotate on an axis, annular electrodes supported by said tank, a magnetic core in said tank, and primary and secondary circuits surrounding said core, said secondary being electrically connected to said electrodes.

2. In a rotary metal stock heater, an annular rotatable tank, annular electrodes supported by said tank, a magnetic core in said tank, and primary and secondary circuits surrounding said core, said secondary being electrically connected to said electrodes.

3. In a rotary metal stock heater, a tank mounted to rotate on an axis, annular electrodes supported by said tank, a magnetic core in said tank, a primary circuit surrounding said core, and a secondary composed in part of cooling pipes, also surrounding said core, said secondary being electrically connected to said electrodes.

4. In a rotary metal stock heater, a tank mounted to rotate on an axis, annular electrodes supported by said tank, contact members connected to said electrodes, and cooling means for said electrodes and contacts, comprising pipes leading through said tank, whereby the liquid in said tank is also kept cool.

5. In a rotary metal stock heater a tank mounted to rotate on an axis, annular electrodes supported by said tank, a magnetic core in said tank, primary and secondary circuits surrounding said core, said secondary being electrically connected to said electrodes, and cooling pipes to conduct water extending into said tank and leading to said electrodes, whereby to cool the liquid in said tank and directly cool said electrodes.

6. In a rotary metal stock heater, a tank mounted to rotate on an axis, a generally conical cap structure for said tank providing electrodes, transformer means in said tank to create a heating current when said electrodes are short circuited, conveying means to convey pieces of rod stock above said cap, and individual clamping means spaced about said generally conical cap structure adapted to remove stock from said conveying means, whereby stock is automatically transferred from said conveying means to said cap structure to short circuit said electrodes as said tank rotates.

7. In a rotary metal stock heater, an annular tank mounted to rotate on an axis, an electrode structure mounted on said tank, providing a plurality of pairs of contacts, transformer means in said tank to convey heating current to said electrode structure, and piping in said tank conveying coolant both to said contacts, the electrode structure, and to the liquid in said tank, whereby to cool said electrode structure, contacts, and the transformer means.

8. In a rotary metal stock heater, an annular tank mounted to rotate on an axis, an electrode structure mounted on said tank, providing a plurality of pairs of contacts, transformer means in said tank to supply heating current to said contacts, and piping in said tank constituting means for cooling the transformer, electrodes, and contacts, and also comprising, in part, the secondary of said transformer.

9. In a rotary metal stock heater, a hollow vertical tube, an annular tank surrounding said tube and rotatable therewith, an electrode structure supported by said tank and providing a plurality of pairs of contacts, piping in said tank for circulating cooling liquid therethrough, whereby to keep the coolant liquid which is free in said tank cool, and passages in said hollow tube connected to said piping.

10. In a machine of the class described, a hopper, a rotary heater providing a plurality of angularly spaced electric heating units, conveying means for delivering pieces of stock to said heating means in timed sequence, and automatic grinding means associated with said conveying means to grind each piece of stock prior to its delivery to the heating means.

11. In a machine of the class described, a hopper, a rotatable electrode structure providing a plurality of pairs of contacts, conveying means for conveying pieces of stock in timed sequence from said hopper to a position above said rotatable electrode structure, grinding means adapted to successively grind each piece of stock, means controlled by rotational movement of said electrode structure for transferring pieces of stock from said conveying means to positions between pairs of contacts, and further means for removing pieces of stock from said contacts after being heated a predetermined amount.

12. In a machine of the class described, means for successively grinding and feeding Sept. 4, 1928.  J. KINDERVATER  1,682,969
MAIN ROD BEARING
Filed Dec. 1, 1925  2 Sheets-Sheet 1
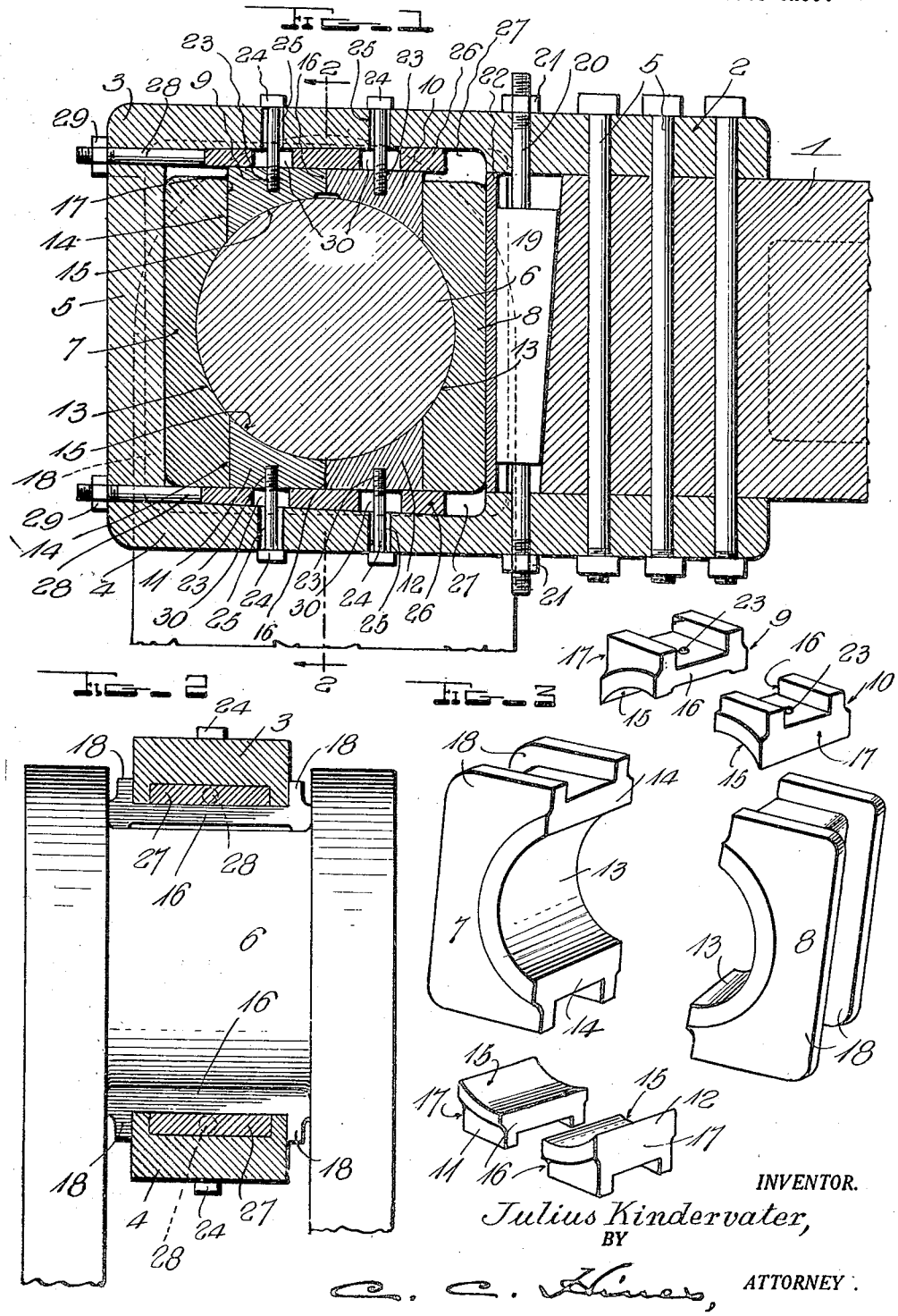
INVENTOR.
Julius Kindervater,
BY
C. C. Hines, ATTORNEY.

Sept. 4, 1928.
J. KINDERVATER
1,682,969
MAIN ROD BEARING
Filed Dec. 1, 1925
2 Sheets-Sheet 2
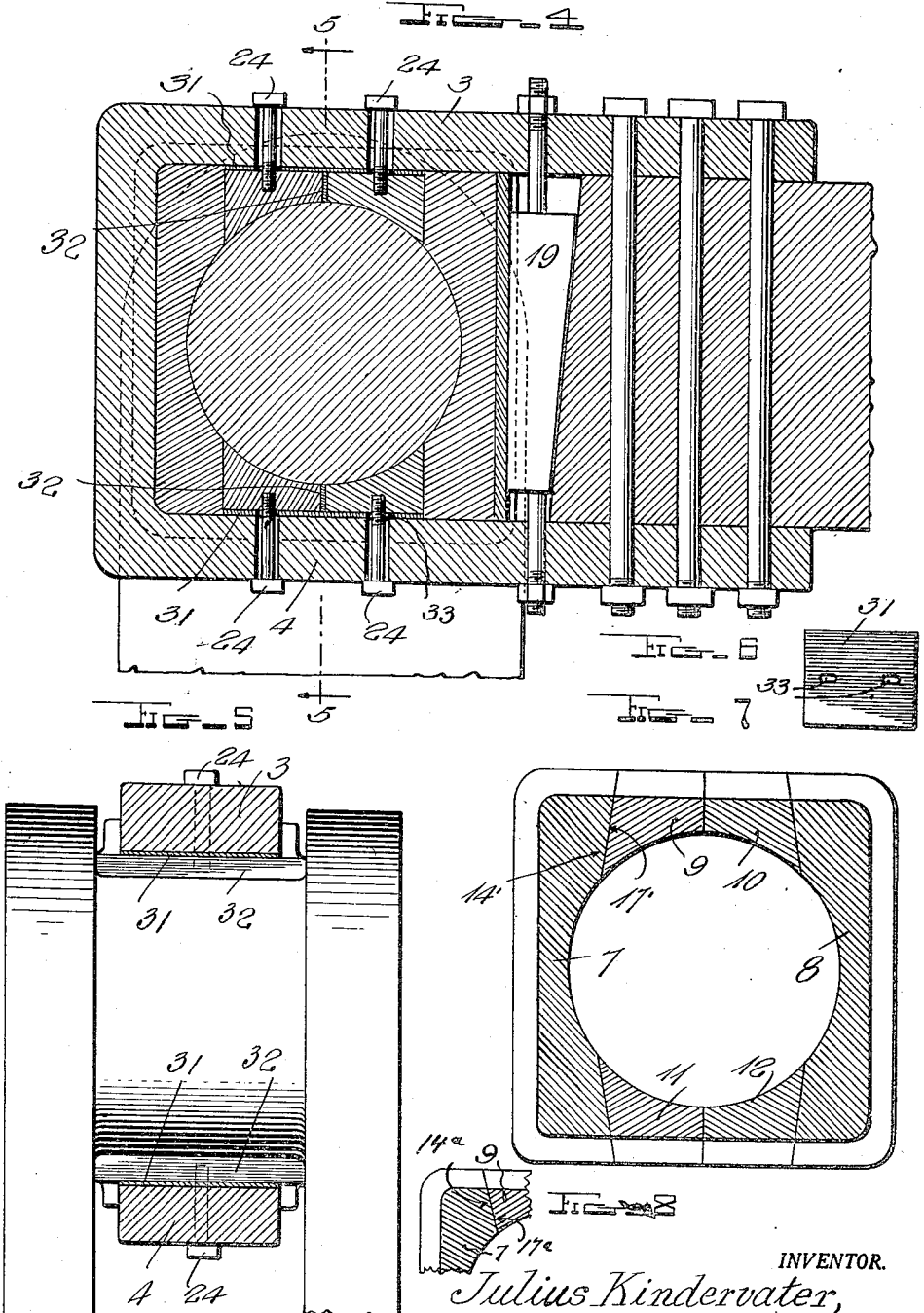
INVENTOR.
Julius Kindervater,
BY
ATTORNEY Patented Sept. 4, 1928.

1,682,969

UNITED STATES PATENT OFFICE.

JULIUS KINDERVATER, OF NEW YORK, N. Y.

MAIN-ROD BEARING.

Application filed December 1, 1925. Serial No. 72,523.

This invention relates to connecting rod bearings, and particularly to improvements in crank pin bearings for the main connecting rods of locomotive engines.

Bearings of this kind as commonly constructed and used consist of two half-brasses, each having an arcuate bearing face of half-circle extent to fit about one-half of the crank pin, the two half-brasses completely enclosing and forming a full bearing about the pin. A material objection to this type of bearing is that it has a tendency to close and hug the pin, when becoming hot, resulting in excessive wear and developing in time excessive looseness and a pound and knock which causes loss of efficiency and cannot be corrected unless new brasses are applied. On account of this amount of wear more or less frequent adjustment of the bearings is necessary up to the point where they become unserviceable. This wear on the half-brasses is vertical as well as horizontal. Adjustment to compensate for wear in a horizontal direction is permissible and wedges or other means are commonly provided for the purpose, but adjustment to compensate for wear in a vertical direction is not permissible with this type of bearing for obvious reasons, and hence such bearings are comparatively short-lived because of their rapid wear and the inability of making adjustments to properly compensate for wear in both directions. In an attempt to overcome these objections it has heretofore been proposed to employ a bearing consisting of a plurality of interengaging and independently movable pieces in excess of two pieces, to wit, two side pieces, a bottom piece and a top piece, having arcuate surfaces of such relative extent in degrees that in the contraction of the bearing about the pin the binding effect will be reduced by distributing or equalizing the frictional stress of the brass around and on the periphery of the crank pin. The objection to this proposed construction, however, is that it does not lend itself to fine horizontal adjustment to compensate for wear in that direction, or to any proper adjustment to compensate for wear in a vertical direction, and particularly to compensate for unequal wear on opposite sides of the vertical center of the crank pin. Another objection to this proposed construction is that it cannot be used in the bearings of center cranks, such as those of three-cylinder locomotives, because of the impossibility of passing the parts over the crank pin in assemblage. A still further objection to the said proposed construction is the impossibility of using full flanges on the bearing pieces in order to hold them from lateral movement, as a result of which the interconnected bearing pieces are apt to tilt and bind under lateral strains and cause unequal wear and friction, thus in a measure reducing the efficiency of the bearing and nullifying to a greater or less extent the purpose for which it is designed.

One object of my invention is to provide a bearing consisting of at least six relatively movable pieces, to wit, two side pieces, two top pieces and two bottom pieces, constructed and operating to adapt their bearing faces to wear truly and to prevent them from binding unduly on the crank pin and causing undue friction, knocking or excessive wear, so that a long-lived bearing will be produced.

Another object is to provide a sectional bearing of the character described in which each bearing piece will have an arcuate bearing surface of adequate extent for a bearing action without undue wear, and which bearing is adapted for fine horizontal and vertical adjustments to compensate for wear in both directions, and for vertical adjustments to compensate for unequal vertical wear on opposite sides of its vertical center.

Still another object is to provide a sectional bearing in which the several bearing pieces are provided with lateral flanges, collectively providing full flanges around each side of the bearing, for preventing their lateral displacement or lateral tilting movements under twisting strains liable to cause the bearing members to bind and produce unequal wear.

Still another object is to provide a sectional bearing which may be easily assembled for use with equal efficiency in connection with either a disk crank or a center crank.

Still another object is to provide a sectional bearing having improved adjusting means and capable of a finer and more efficient adjustment of its parts to compensate for wear, to better fit the pin, and to prevent undue binding and excessive wear so that a long-lived bearing of maximum efficiency until worn out will be obtained.

Still another object is to provide a bearing which may be initially cast in one piece and cut or divided accurately into its working sections, so that true complemental sections may be produced which may be machined wholly or largely at one time, and in which the individual sections when worn may be remachined and salvaged for reuse.

With these and other objects in view, the invention consists of the features of construction, combination and arrangement of parts, hereinafter fully described and claimed, reference being had to the accompanying drawings, in which:—

Figure 1 is a central vertical section through a portion of a locomotive main rod embodying a bearing constructed in accordance with my invention.

Figure 2 is a vertical transverse section on line 2—2 of Figure 1.

Figure 3 is a perspective view of the parts of the bearing brass disassociated but disposed in proper relative positions.

Figure 4 is a view similar to Figure 1 showing a modified form of adjusting means.

Figure 5 is a vertical transverse section on line 5—5 of Figure 1.

Figure 6 is a plan view on a reduced scale of one of the shims or liners shown in Figures 4 and 5.

Figure 7 is a vertical longitudinal section through a modified form of bearing brass with parts arranged in assembled relation.

Figure 8 is a fragmentary view similar to Figure 7 showing another modification.

Referring now more particularly to the form of my invention shown in Figures 1 to 3, inclusive, 1 designates an end portion of a locomotive main rod, which is provided with a bearing frame or strap 2. As shown herein, the bearing frame or strap 2 comprises top and bottom rails 3 and 4 and an outer end rail 5, the inner end of the strap being open and the rails 3 and 4 being provided with extremities overlapping the end of the rod 1 and connected therewith by bolts 5, whereby the bearing frame or strap is held on the rod and detachably connected therewith.

The portion of the frame or strap projecting beyond the end of the rod 1 is provided with a bearing opening or cavity, of rectangular or oblong rectangular form, for the passage of the crank pin 6 and to receive the connecting bearing brass. This bearing brass, in accordance with my invention, is of multi-section type, comprising at least six sections, to wit, outer and inner end sections 7 and 8, a pair of top sections 9 and 10 and a pair of bottom sections 11 and 12. Each of the sections 7 and 8 is provided on its inner side with an arcuate bearing face 13 intersecting and extending between top and bottom abutment faces 14, and each of the sections 9, 10, 11 and 12, respectively, is provided with an inner arcuate abutment face 15 and extending between and intersecting end abutment faces 16 and 17. The abutment faces 17 of the top and bottom bearing sections engage the abutment faces 14 of the end bearing sections 7 and 8, and the abutment faces 16 of the bearing sections 9 and 10 and 11 and 12, respectively, are arranged to engage each other. Each bearing section 7, 8, 9, 10, 11 and 12 is further provided with flanges 18 at opposite sides thereof, which extend around the outer faces thereof and the full distance between the end faces thereof, the arrangement being such that the flanges of the assembled bearing sections extend entirely around the sides of the bearing at each side of the bearing frame and engage the sides of the bearing frame to hold the bearing members and the bearing as a whole against lateral or sidewise movements or displacement.

The bearing section 7 extends the full depth of the bearing opening in the strap between the end rail 5 and the adjacent side of the crank pin 6, while the bearing section 8 extends the full depth of the bearing opening in the strap and engages the diametrically opposite side of the crank pin 6. A vertically adjustable wedge member 19 is provided between the outer face of the bearing member 8 and the end of the rod 1 for holding the bearing members assembled and adjusting them horizontally to compensate for wear. This wedge 19 is carried by a bolt 20 slidably engaged with the rails 3 and 4 and adapted to be locked in adjusted position by suitable means, as by the use of nuts 21. If desired a shim or liner 22 may be placed between this wedge and the bearing piece 8 in order that a full bearing contact on the latter may be obtained, which wedge or liner may be removed and others of different thicknesses applied from time to time to enable accurate adjustments to be made to compensate for bearing wear at different time periods in the life of the bearing. Each bearing member 9, 10, 11 and 12 is provided with a straight outer face in which is formed a threaded socket 23 receiving the threaded end of an adjusting and locking screw 24, which screw extends outwardly through an opening 25 in the rail 3 or 4, as the case may be, and has a headed outer end bearing on the outer end face of said rail. By slackening these screws the top and bottom bearing sections, or either of them, may be loosened to permit horizontal adjustment of said bearing sections with the end bearing sections 7 and 8, and the opening 25 may be of sufficient size or diameter to permit requisite shifting movements of the bolts 24 therein, and by means of said bolts 24 the top and bottom bearing sections may be loosened for adjustment in a vertical direction and locked in adjusted position. The outer faces of all the bearing members 9, 10, 11 and 12, at the top and bottom of the frame or strap 2, are straight or plane-surfaced and are engaged by sliding tapered keys or wedges 26 fitted to slide in keyways or recesses 27 in the rails 3 and 4. These wedges are connected or provided with adjusting and securing bolts 28 extending outwardly through the end rail 5 and provided with securing nuts 29. Each tapered key or wedge is formed with solts 30 for the passage of the related screws 24, so as to permit sliding motion of the wedges without interference from the screws and adjusting motion of the screws without interference from the wedges. These wedges have outer inclined faces and the outer walls of the recesses 27 in which they slide are also inclined, the arrangement being such that by sliding the wedges inwardly or outwardly the bearing as a whole may be adjusted vertically in one direction or the other in the bearing opening. It will thus be evident that upon slackening the screws 24 and compensatively adjusting the wedges 26 as required the bearing as a whole may be adjusted to compensate for vertical wear, after which the screws 24 and wedges may be locked to hold the bearing in adjusted position. It will also be evident that by adjustment of the screws 24 and wedges 26 the bearing members on either side of the vertical center of the bearing may be adjusted independently of those at the opposite side of the vertical center of the bearing, in order that vertical adjustment may be made to compensate for unequal wear at opposite sides of the vertical center of the bearing. The abutment faces of the bearing pieces are both straight and plane-surfaced to permit them to slide freely in contact in order that such adjustments may be readily and conveniently made, and all of these abutment faces may be arranged perpendicularly to the plane of the rod 1, as shown.

It will be seen from the foregoing that the invention provides a bearing so divided or composed of such a number of pieces, adjustably mounted, as to admit not only of horizontal adjustment of the bearing as a whole to compensate for wear in that direction, but also vertical adjustment of the bearing as a whole to compensate for wear in that direction, and further for vertical adjustment of the bearing on either side of its vertical center to compensate for such unequal vertical wear as may occur in service, these combined adjustments being of importance in enabling a bearing to be provided which may be adjusted to meet all service conditions in order that undue friction and hammering or knocking may be prevented and a bearing capable of long service use produced. The vertical adjustments referred to are obviously permissible and obtained by making each top and bottom bearing portion in two sections. By making the bearing of a plurality of sections, each having an arcuate surface of a limited extent to bear upon the crank pin, expansion and contraction of the bearing is better equalized, and accordingly there is much less tendency of the bearing to unequally contract and bind unduly upon the crank pin and cause excessive friction and wear when it becomes hot. In practice, and as shown, in order to further reduce excessive binding action and wear, as well as to facilitate assemblage and disassemblage of the bearing elements, I provide the bearing pieces with arcuate bearing faces of novel arcuate bearing extent throughout the bearing. It will be observed that the bearing faces 13 of the bearing members 7 and 8 extend approximately through an arc of 90°, and that the bearing faces 15 of the bearing pieces 9, 10, 11 and 12 extend each through an arc of substantially 45°, the two upper bearing pieces 10, as well as the two lower bearing pieces 11 and 12 jointly have a bearing arc of 90°. By this construction, all the bearing pieces are given an adequate but restricted range of bearing contact with the crank pin 6 for the purposes above-described, and at the same time this permits each sectional top and bottom bearing piece to be made of comparatively large size and have an arcuate bearing extent sufficient to enable it to better sustain the wear and to hold it from tilting or chattering and causing excessive wear at the ends of its bearing arc, liable to occur in the use of a bearing arc of less than 45°. By giving these top and bottom bearing pieces such an extent of bearing arc, a better general solidity of the bearing is gained, and at the same time each bearing piece may be of such comparatively large size as to enable it to be better handled and machined in refinishing and salvaging a worn bearing. It will further be observed that by this construction each end bearing section and two contiguous top and bottom bearing sections on the same side of the bearing will collectively have a bearing extent through an arc of 180°, permitting of the more convenient assemblage and disassemblage of the bearing pieces and such assemblage as is of importance and essential in the use of the bearing in connection with a center crank pin. In applying a main rod embodying this bearing to a disk crank, the bearing may be assembled in the manner hereinafter described before application and then slipped over upon the crank. In assembling the bearing for use and application in connection with a center crank, the mode of assemblage and application is as follows: With strap 2 disconnected from rod 1, wedges 26 and bearing pieces 7, 9 and 11 are inserted into the strap, the strap is then slipped over the crank pin via its open end, this operation being permissible because the inserted bearing pieces have a